United States Patent [19]

Dauvergne

[11] 3,774,390
[45] Nov. 27, 1973

[54] GAS ACCELERATOR

[75] Inventor: Hector A. Dauvergne, San Leandro, Calif.

[73] Assignee: Dauvergne Bros. Inc.

[22] Filed: Sept. 30, 1970

[21] Appl. No.: 76,908

[52] U.S. Cl. .................... 60/13, 123/66, 123/71 R, 60/248, 60/39.78
[51] Int. Cl. ............................................ F02b 37/04
[58] Field of Search .................. 123/66, 67, 68, 69, 123/74; 60/13, 248

[56] References Cited
UNITED STATES PATENTS

| 862,867 | 8/1907 | Eggleston | 417/395 |
| 2,308,974 | 1/1943 | Harper | 417/510 |
| 2,546,965 | 4/1951 | Bodine, Jr. | 417/364 |
| 2,765,616 | 10/1956 | Cockerell | 123/66 X |
| 1,825,525 | 9/1931 | Johansson | 123/68 |
| 2,585,968 | 2/1952 | Schneider | 60/13 |
| 2,590,457 | 3/1952 | Pouit | 60/248 |
| 3,007,302 | 11/1961 | Vincent | 60/13 |
| 3,574,997 | 4/1971 | Syrovy | 60/13 |

OTHER PUBLICATIONS

Internal Combustion Engines Gill Smith Zuirys The United States Naval Inst. Annapolis, Md. 1952, pages 8–6 and 9–6.

Primary Examiner—Lawrence M. Goodridge
Attorney—Joseph B. Gardner

[57] ABSTRACT

A gas accelerator comprising both an air compressor and a heat engine of the internal combustion type. Although the mechanism is useful as an externally driven gas compressor, as a self-driven gas compressor, and as a self contained power plant delivering torque to an output power shaft, it is specifically adapted for use in association with a gas turbine wheel and combustion chamber therefor to provide therewith a relatively non-polluting power plant for automotive vehicles and the like. The mechanism includes a chamber subdivided into compressor and engine compartments by a diaphragm reciprocable between alternate extreme positions respectively defining maximum volume for the compressor compartment and minimum volume for the engine compartment, and vice versa. Each compartment is provided with valve-equipped inlet and outlet ports, and the diaphragm is connected with a reciprocable plunger coupled by crank mechanism to a power shaft which is driven by the plunger on the power stroke thereof in response to ignition of a combustible charge within the engine compartment. When associated with a turbine wheel, the shaft of the mechanism is also connected therewith and is driven thereby.

14 Claims, 8 Drawing Figures

Patented Nov. 27, 1973

INVENTOR:
HECTOR A. DAUVERGNE
BY:
Joseph B. Gardner
ATTORNEY

INVENTOR:
    HECTOR A. DAUVERGNE
BY:
    *Joseph B. Gardner*
    ATTORNEY

GAS ACCELERATOR

This invention relates to a gas accelerator having the characteristics of a power plant or prime mover, and it relates more particularly to compressor and engine mechanism operative in association with a gas turbine wheel and combustion chamber therefor to develop a high energy output (i.e., high shaft or brake horse power) relative to the investment of fuel energy at the input thereto. The mechanism is useful in a great number of environments in which turbine and internal combustion engines are now used, and it can also be employed as a relatively high volume, low pressure gas compressor.

It has been well established that heat engines are a major contributor to the ever-increasing pollution of our atmospheric environment which, as a consequence of the reciprocable piston-cylinder internal combustion form thereof being used in automotive vehicles, is especially severe around the larger population centers because of the concentration of automotive vehicles thereat. In this respect, the air pollutants in the exhaust emissions of a reciprocating internal combustion engine are, to a very great extent, a functional characteristic thereof, although certainly the magnitude of the air pollutants in the exhaust emissions from such engines can be reduced by altering the composition of the petroleum fuels burned thereby, especially by omitting the lead additives now present in such fuels; by operating the engines at their peak performance and by generally reducing the size or power of such engines; and by employing in combination with these engines the most advanced smog abatement accessories available. It will be apparent, however, that these measures are expedients tending to mitigate the severity of the pollutant emissions problem, but in no sense constituting a fundamental attack thereon.

Use of the turbine engine has sometimes been proposed as a major step toward solution of the air pollution problem attributable to the emissions from heat engines because the gas turbine is inherently an engine having less air-polluting emissions than the internal combustion engine and because it can operate successfully on lower grade fuels which produce less undesirable emissions than the higher octane fuels now required by modern high compression internal combusion engines. The turbine engine has many disadvantages, however, among which are the sharp departure it represents from traditional and accepted automobile engine design; the relatively high-pitched noise produced by the rotating turbine wheel and also by the rotary compressors used in conventional turbine engines to produce the high volume of air required for its operation; the slow starting characteristic of such turbine engines often requiring that they be rotated to a velocity within the range of about 8,000 to 18,000 RPM before self-sustaining ignition is maintained, thereby necessitating the use of starting equipment for the engine capable of imparting such rotational velocities thereto; and the high temperatures of the exhaust gases discharged from the engine, usually at a fairly high velocity.

I have discovered that many, if not all, of the disadvantages associated with the conventional gas turbine engine can be obviated by use of a novel gas accelerator in association with a turbine wheel and combustion chamber therefor, and which gas accelerator of itself has the characteristics of a power plant or prime mover, including both a relatively low pressure compressor section and a low-compression-ratio internal combustion engine section. A fundamental concept embodied in such novel gas accelerator mechanism derives from the realization that a very large volumetric displacement can be effected with a very small linear movement if the volume displaced has the geometric configuration of a cone, or frustum or a cone, and is the displacement effected by a large area diaphragm fixed at its perimetric edge and reciprocable elsewhere between maximum and minimum volume extremes. Although the usual cylindrical piston having the same area as the base of such diaphragm would define a greater volumetric displacement for the same axial reciprocation, such a large piston-and-cylinder combination is impracticable because of the requisite ring size and the consequent very high frictional losses owing to the slidable engagement of such rings with the circumjacent walls of the cylinder.

In view of the foregoing, a general object of the present invention is to provide an improved power plant or prime mover or gas accelerator having both compressor and internal combustion sections, and which mechanism is especially suited for use in conjunction with the combustion chamber and turbine wheel of a gas turbine engine to provide an overall system having functional advantages of both the internal combustion engine and the gas turbine engine while at the same time obviating many of the disadvantages of each.

Further objects, among other, of the present invention are in the provision of a power system that can use presently available petroleum fuels; that develops power within a few seconds when cold (e.g. within 5 seconds); that has significantly less air pollutants in the exhaust emissions therefrom and which emissions will constitute for the most part a non-toxic mixture of carbon dioxide, water and lesser secondary components; that has operating temperatures and mechanical velocities well within the range accommodated by ordinary metals such as the cast iron and steel alloys presently used in conventional piston engines; and that will respond instantly to changes in the throttle control, being fully throttlable within the range necessary to run any automatic transmission or nay regular clutch and manual transmission in an automotive vehicle.

Additional objects and advantages of the invention, especially as concerns particular features and characteristics thereof, will become apparent as the specification continues.

Mechanism embodying the present invention is useful in and of itself as a power plant or prime mover, it is also useful in association with a turbine wheel and combustion chamber therefor to form a total power system therewith, and it is also divisible into separable sections which can be used as a compressor and as a low-compression-ratio internal combustion engine. In general terms, the mechanism has a compressor section provided with an inlet through which atmospheric air is drawn thereinto, and with an outlet through which compressed air is accelerated to a utilization device which may be the combustion chamber preceding a turbine wheel. The mechanism further has an engine section providing an inlet through which compressed gas (usually compressed air) is directed thereinto from the compressor section during certain phases in each cycle of operation of the mechanism. The engine section also includes an outlet through which the products of combustion are expelled usually toward the same utilization device as that associated with the compressor section or, in the preceding example, toward the combustion chamber preceding such turbine wheel. A common diaphragm separates the two sections and is reciprocable between position extremes respectively corresponding to minimum volume for the compression section and maximum volume for the engine section, and vice versa. The diaphragm is connected with a reciprocable plunger coupled by crank mechanism to a rotatable power shaft, and the plunger imparts torque thereto in response to combustion within the engine section. This same power shaft, in the case of the utilization device being a turbine wheel, is connected with the turbine wheel so as to be rotatably driven thereby.

An embodiment of the invention is illustrated in the accompanying drawings, in which.

Figure 1:
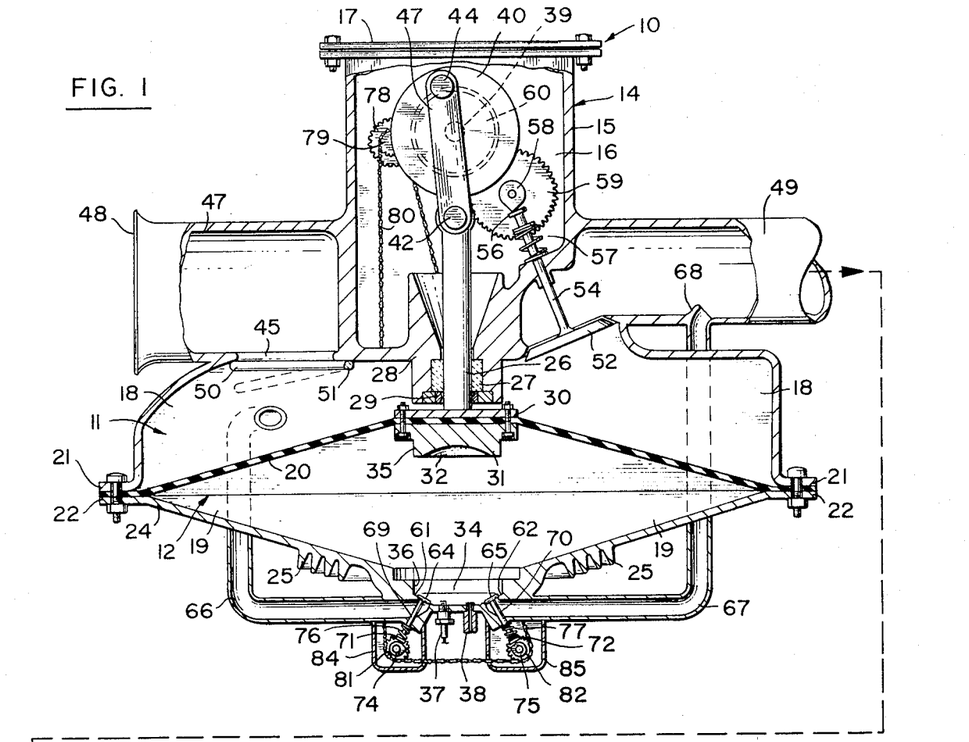
FIG. 1 is essentially a broken vertical sectional view taken through the center of a mechanism embodying the invention.

Mechanism embodying the present invention is generally depicted in FIG. 1 and is denoted in its entirety with the numeral 10. As explained hereinbefore, the mechanism 10 is sometimes referred to as a power plant or prime mover, and it is in the nature of a gas accelerator, including both a low pressure compressor or blower and a low-compression-ratio internal combustion engine. These two functional subdivisions of the mechanism 10 have common components, as will be explained in detail hereinafter, but for purposes of general reference and convenience of discussion, the compressor and engine sections of the mechanism are respectively designated with the numerals 11 and 12. During a complete cycle of operation of the mechanism 10, which in angular terms referenced to the main rotatable components thereof requires an arcuate distance of 720°, the compressor section 11 and engine section 12 function to compress a gaseous fluid during certain predetermined phases in such cycle and to ignite a combustible admixture of air and fuel to generate power during other predetermined phases thereof.

The mechanism 10 includes casing structure 14 that, in a conventional manner, may be formed by bolting together or otherwise interconnecting a plurality of separate casing components. In this respect, the casing structure 14 includes a crankcase 15 defining the usual chamber or space 16 in which are mounted crank mechanism, gearing, etc., and which crank space 16 is closed by a removable cover or pan 17 bolted to the crankcase 15 and sealingly related thereto by a conventional gasket member. The casing structure 14 enlarges beyond the lateral dimensions of the crank case 15 and defines a large chamber subdivided into a compressor compartment 18 and a combustion compartment 19 by a diaphragm 20 mounted within the chamber intermediate the ends thereof and extending completely thereacross. In the form shown, the casing structure 14 is turned outwardly to form a perimetric flange 21, and bolted thereto is the mating perimetric flange 22 of a casing head 24 which may be equipped externally with cooling fins 25 to dissipate heat developed by combustion occurring within the compartment 19. In the specific embodiment of the invention being considered, the diaphragm 20 is a flexible component having a perimetric edge portion confined between the mating flanges 21 and 22, thereby hermetically separating or subdividing the total chamber into the aforementioned compartments 18 and 19.

The diaphragm 20 is displaceable between maximum and minimum position extremes respectively corresponding to states of maximum and minimum volumes with reference to each of the compartments 18 and 19. Such position extremes are respectively shown in FIGS. 5 and 6 (the positions shown in these figures being slightly beyond and displaced from the extreme positions assertedly represented thereby), and since the compartments 18 and 19 are reversely or oppositely oriented, it will be appreciated that one extreme position of the diaphragm 20 will essentially represent maximum volume for the compartment 18 and minimum volume for the compartment 19, and vice versa whenever the diaphragm 20 is in its opposite extreme position.

A linearly reciprocable plunger 26 is connected with the diaphragm 20 for substantially concurrent movement therewith between the aforementioned position extremes. In the mechanism 10 illustrated in FIG. 1, the plunger 26 is vertically oriented and it is supported for reciprocable displacements relative to the casing structure 14 in a bearing 27 confined within an opening provided therefor in a large center support 28 forming a part of the casing structure. A packing gland 29 may be used adjacent the bearing 27 to sealingly relate the plunger 26 thereto. At its extreme end, the plunger 26 is equipped with a platform or diaphragm driver 30 over which the diaphragm 20 is drawn, and rigidly secured to the platform 30 on the opposite side of the diaphragm 20 is a piston or combustion head 31 which may be bolted to the platform, as shown in FIG. 1. Thus, the diaphragm 20 is fixedly secured to the plunger 26, and is partially covered adjacent its center within the combustion compartment 19 by the piston or combustion head 31.

The piston head 31 has a stepped configuration and is provided along the center thereof with an arcuate cavity 32 cooperative with a similarly configurated cavity 34 formed in the cylinder head 24 adjacent the center portion thereof. The perimetric side wall 35 provided by the stepped portion of the piston head 31 generally bordering the cavity 32 is in the nature of a short piston that enters and fits closely with the perimetric surface or short cylinder 36 bordering the cavity 34 in the cylinder head 24 whenever the piston head 31 is displaced toward the extreme position of the diaphragm 20 in which it lies along the inclined walls of the head 24. As will become apparent hereinafter, the compressed air and fuel admixture present within the compartment 19 is essentially confined within the total spaced defined by the cavities 32 and 34, and combustion occurs therewithin so that initially, the reactive pressure forces resulting from combustion are essentially confined to reactive association with the piston head 31 rather than all along the exposed surface of the diaphragm 20.

In this general reference, it may be noted that a spark plug or igniter 37 extends through the cylinder head 24 and into the cavity 34, and it functions in an ordinary manner in timed relation with the reciprocable displacements of the diaphragm 20 and plunger 26 to cause ignition of the compressed combustible admixture of air and fuel within the compartment 19 during certain predetermined intervals in a complete cycle of operation of the mechanism 10. As respects the present invention, the igniter 37 and apparatus associated therewith for developing a spark across the igniter points may be completely conventional and, by way of example, may be an ordinary distributor and ignition coil combination operated in the standard manner. Similarly, fuel must be admitted to the combustion compartment 19, and although fuel may be admitted by means of a carburetor associated with the air inlet into the compartment 19, in the particular mechanism 10 being described, fuel is injected into the compartment 19 through a nozzle 38 located at the cavity 34 and connected with a standard fuel injector system of wholly conventional design and operation, forming no part of the present invention.

Operatively associated with the reciprocable plunger 26 is a power shaft 39 journaled in the casing structure 14 for free rotation relative thereto. The power shaft 39 may take the usual form of a crank shaft having an offset throw connected with the plunger 26 by means of the usual connecting rod and wrist pin arrangement, or it may take the form illustrated in FIG. 1 in which the plunger is connected therewith by crank means constituting a large disc 40 keyed or otherwise secured to the shaft 39 so as to rotate therewith and a link or rod 41 pivotally connected both to the plunger 26 at 42 and to the disc 40 at 44. It will be evident that such interconnection of the plunger 26 and power shaft 39 interrelates the linear motion described by reciprocable displacements of the plunger with the angular motion described by rotation of the power shaft. Thus, during the power stroke of the plunger 26 upon ignition of a combustible charge within the compartment 19, the power shaft 29 will have angular motion positively imparted thereto.

The chamber formed by the compartments 18 and 19 is provided with a valve-equipped inlet and with a valve-equipped outlet and in more particular terms, each of the compartments 18 and 19 is provided with both an inlet and an outlet, and each of the inlets and outlets is controlled by a valve associated therewith. Considering first the compression compartment 18, the inlet and outlet ports thereof are respectively denoted with the numerals 45 and 46. An inlet conduit 47 essentially forming part of the casing structure 14 is in open communication with the inlet port 45 and is provided with an outwardly flared access opening 48 affording ingress of air which is carried to the inlet for movement therethrough into the compartment 18. Analogously, an outlet conduit 49 for accelerated gases is in open communication with the outlet port 46 and receives the pressurized gaseous discharge therefrom.

The inlet port 45 is equipped with a valve 50 which, in the form shown, is a pressure-responsive valve which serves as a check valve permitting air to flow inwardly through the port 45 into the compartment 18 but preventing reverse flow of air. Accordingly, whenever the diaphragm 20 is displaced downwardly, as viewed in FIG. 1, to enlarge the compartment 18, the pressure therein tends to decrease whereupon the valve 50 permits air to flow inwardly into the compartment to maintain the pressure therein. The valve 50 is pivotally supported, as shown at 51, and is equipped with a relatively weak spring (a torque spring, not shown, for example) operative to bias the valve toward the closed position thereof.

The outlet port 46 is equipped with a poppet valve 52 having the usual frusto-conical head adapted to sealingly engage the complementary circumjacent walls of the outlet port 46, and having also a stem 54 supported for reciprocable displacements in a bearing 55 provided for this purpose by the casing structure 14. Adjacent its free end, the stem 54 is enlarged, as shown at 56, to provide a cam follower and a seat for one end of helical compression spring 57 which at its opposite end seats against the casing structure adjacent the bearing 55, thereby biasing the valve 52 toward the closed position thereof. The valve 52 is cyclically displaced into the open position thereof by a cam shaft or valve lifter 58 journaled for rotational movement with respect to the casing structure 14 and equipped with a gear 59 in meshing engagement with, and thereby driven by, a drive gear 60 mounted upon the power shaft 39 so as to rotate therewith. It may be observed that the ratio of the power shaft 39 and cam shaft 58 is one-to-one so that the valve 52 is opened for one particular interval during each 360° rotation of the power shaft 39.

In a similar manner, the combustion compartment 19 is provided with an inlet port 61 and with an outlet port 62 respectively equipped with poppet valves 64 and 65. The inlet 61 communicates through a conduit 66 with the compression compartment 18 and, as indicated in FIG. 1, is in continuous open communication therewith. The outlet port 62 communicates through a conduit 67 with the aforementioned outlet conduit 49 with which it is in continuous open communication. Advantageously, the intersection of the conduits 67 and 49 may be defined in part by an arcuate wall section 68 which facilitates a change in direction of the gaseous discharge into the conduit 49. The valves 64 and 65 are of conventional design (as is the aforementioned valve 52), and they are respectively equipped with stems 69 and 70 having enlargements or cam followers 71 and 72 at the free end thereof that ridingly engage cam shafts 74 and 75, respectively, which are effective to cyclically displace the valves associated therewith into their open positions against the biasing force of the helical compression springs 76 and 77 which bias the valves toward the closed positions thereof. The valve stems 69 and 70 are respectively supported for reciprocable displacements within openings provided therefor in the casing structure 14 and, more particularly, in the cylinder head 24 thereof.

The cam shafts 74 and 75 are rotatably supported by the casing structure 14 and are rotatably driven through a drive train that includes a gear 78 rotatably supported within the crank case 15 and meshingly engaging the drive gear 60 so as to be driven thereby. A sprocket 79 constrained to rotate with the gear 78 has an endless timing chain 80 entrained thereabout which passes upwardly through a space provided therefor by a cover plate (not shown) attached to one end of the casing structure 14 in the usual manner. Adjacent its opposite end, the chain 80 is entrained about sprockets 81 and 82 respectively secured to the cam shafts 74 and 75 so as to rotate therewith. Accordingly, whenever the power shaft 39 is rotated, the cam shafts 74 and 75 rotate therewith, and the time relationship is such that the valves 64 and 65 are each opened once during each 720° rotation of the power shaft. It may also be observed that the time relationship of the valves 64 and 65 is out of phase by approximately 360°, as will be explained in greater detail hereinafter. Covers 84 and 85 may be used to enclose the cam shafts 74 and 75 along the lengths thereof inwardly from the location of the sprockets 81 and 82.

Figure 2:
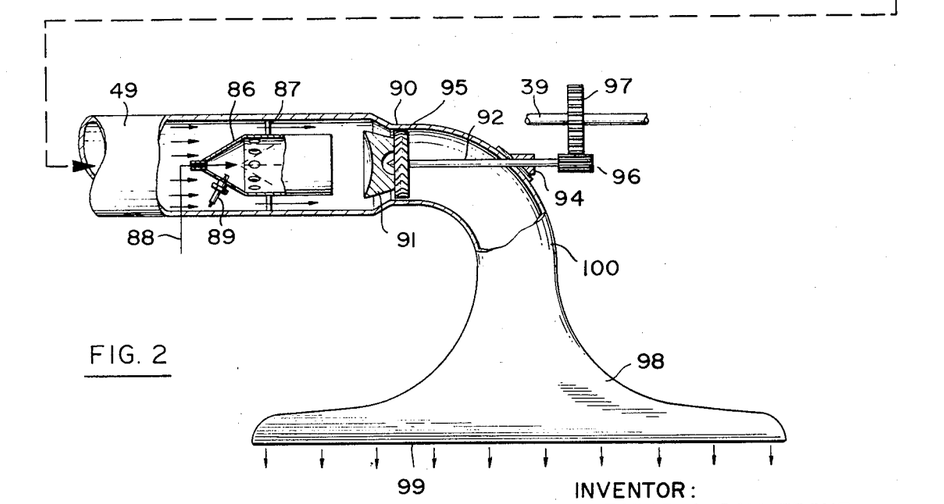
FIG. 2 is a broken longitudinal sectional view (partly in elevation) of a burner, turbine, and exhaust diffuser which can be used with the mechanism illustrated in FIG. 1— the functional interconnection of the structures shown in FIGS. 1 and 2 being indicated by broken lines.

As shown in FIG. 2, the conduit 49 is provided therealong with a burner section having a burner or flame holder 86 of substantially smaller cross section than that of the conduit 49 and fixedly supported therein by a spider or support 87. Fuel is supplied to the burner 86 through a nozzle-equipped fuel supply line 88, and an igniter 89 is used to initiate combustion within the burner which then becomes self-sustaining. As respects the present invention, the burner 86, fuel delivery thereto and igniter 89 may be completely conventional and all are well known in the art. Accordingly, no further description of the structure thereof need be set forth.

Down stream of the burner 86, the conduit 49 narrows, as shown at 90, and is equipped thereat with a centered baffle 91 which further reduces the cross sectional area of the conduit thereat, thereby significantly increasing the velocity of the gases flowing therepast. Rotatably supported adjacent the section 90 upon a shaft 92 journaled for rotation in a bearing-equipped boss 94 provided by the conduit 49 is a turbine wheel 95 that is rotatably driven by the gases flowing therethrough and impinging against the blades thereof. Exteriorly of the conduit 49, the turbine shaft 92 is equipped with a gear 96 meshingly engaging a gear 97 keyed or otherwise fixedly mounted upon the aforementioned power shaft 39 so as to prevent relative rotation therebetween. The gear 97 is much larger than the gear 96 so as to define a velocity differential therebetween and between the power and turbine shafts 39 and 92. By way of example, the velocity differential is a reduction from the shaft 92 to the shaft 39 which might be of the order of 5 to 1 so that the shaft 39 would be driven at an angular velocity of approximately 3,200 RPM whenever the turbine shaft 92 is rotated at approximately 16,000 RPM. Again as respects the present invention, the turbine wheel 95 together with the gear, shaft, bearing and like components associated therewith may be completely conventional and need not be further described.

The power shaft 39 on the left-hand side of the gear 97, as viewed in FIG. 2, extends into the crank case 15 and is connected with the plunger 26, as heretofore explained, and if not integral with the shaft section 39 within the crank shaft 15, it must have a one-to-one velocity ratio with respect thereto. On the right-hand side of the gear 97, the shaft 39 is connected with a utilization device which, in the case of an automotive vehicle, will be the usual transmission forming a part thereof.

The gaseous flow through the turbine wheel 95 is discharged to atmosphere, and in the particular arrangement being considered, such discharge is effected through a funnel shaped diffuser and muffler 98 having a long narrow exhaust port 99 that may be located at any convenient position, such as along the rear bumper of an automobile when the mechanism is used in such environment. Fur purposes of preventing back pressure, the cross sectional area of the opening 99 should be no less, and preferably larger, than the cross sectional area of the exhaust section 100 of the conduit 49 down stream of the turbine wheel 95. In this same particular, the size of the various inlet and outlet openings will generally correspond to the cross sectional areas of the conduits respectively connected therewith so as to minimize losses in the movement of gases therebetween.

It has been found that the diffuser or muffler 98 is effective (without use of baffles or a sound-absorbing lining) to reduce the level of sound in the exhaust section 100 which otherwise would be emitted to atmosphere in the absence of the diffuser. It is theorized that the sound reduction occurs because of dissipation of a part of the kinetic energy in the exhaust gases owing to expansion thereof from the exhaust section 100 into the larger volume of the diffuser; because of the coanda or skin effect which causes the gases to follow the contours of the diffuser, thereby creating a reduced pressure zone at the center of the diffuser which tends to draw in atmospheric air for admixture with the exhaust gases which reduces their temperature and therefore further reduces their kinetic energy; and because of wave interference attributable to the changing contour of the diffuser which is especially effective as respects turbine noise.

A complete cycle of operation of the mechanism 10 will now be described with reference being made in particular to FIGS. 3 through 8 which respectively illustrate successive stages in such complete cycle of operation. As heretofore stated, the particular engine 12 being considered effects one complete operational cycle for each two rotations of the power shaft 39 (i.e., an angular displacement thereof constituting 720°); and combustion occurs once during each such complete cycle, wherefore the shaft is driven by the plunger 26 during cyclically repetitive intervals occurring once for every two rotations of the shaft. However, the mechanism 10 is susceptible of both two-cycle and four-cycle operation in accordance with the particular valving and timing used, and a multiple stage mechanism can be provided, all as is well known.

Figure 3:
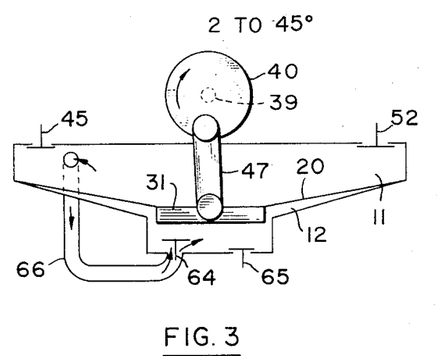
FIGS. 3 through 8 are diagrammatic views respectively depicting different phases in a complete operational cycle of the mechanism shown in FIG. 1.

Considering the mechanism 10 to have the condition illustrated in FIG. 3 as the starting condition, the diaphragm 20 is in one of its extreme positions in which it is in substantial abutment with the walls of the cylinder head 24, the valves 50, 52 and 65 are closed, and the inlet valve 64 into the combustion compartment 19 is open. The power shaft 39 and crank disc 40 thereon are rotating in a clockwise direction, and as actually shown in FIG. 3, the shaft and disc are displaced from their zero-displacement or starting position by approximately 2°. This condition of the valves is maintained as the shaft 39 is displaced through about 45° with the result that the progressively diminishing volume of the pressure compartment 18 caused by upward movement of the diaphragm 20 forces a charge of air through the conduit 66 and inlet 61 into the combustion compartment 19.

Next, as illustrated in FIG. 2, the inlet valve 64 into the combusion compartment 19 is closed and the outlet valve 52 from the compression compartment 18 is opened. At the same time, the valves 50 and 65 remain closed, and this condition of all of the valves obtains until the shaft 39 has been displaced through a total angular distance of about 180°. Since the outlet valve 52 for the pressure compartment 18 is open, the diminishing volume of the compartment 18 caused by movement of the diaphragm 20 will expel or accelerate the air previously drawn into the compartment (as will be explained hereinafter) outwardly through the port 46 and into the outlet conduit 49 for conduction therethrough to the turbine combustion chamber therealong. During this same phase interval, a charge of fuel is injected into the combustion compartment 19 through the nozzle 38 for admixture with the charge of air previously admitted thereinto.

Figure 5:
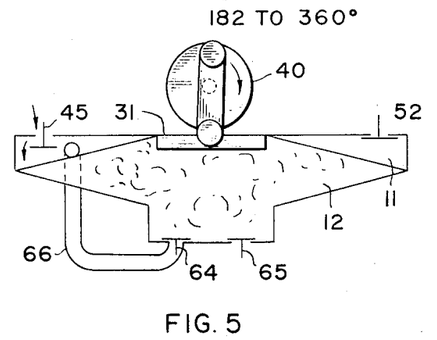

As illustrated in FIG. 5, the diaphragm 20 has been displaced into its opposite extreme position corresponding to the 180° position of the power shaft 39, and in such extreme position, the valves 64 and 65 for the combustion compartment 19 remain closed, the outlet valve for the pressure compartment 18 is closed, and the inlet valve 50 is open. This condition of the valves continues for approximately the next 180° displacement of the shaft 39 or until it has made one complete rotation. Since the volume of the pressure space 18 continuously increases during this displacement of the shaft, a charge of air is drawn thereinto through the inlet 45. At the same time, the progressively diminishing volume of the combustion compartment 19 causes the previously admitted charges therein of air and fuel to be compressed into the composite cavity or combustion space defined by the cavities 32 and 34 in the piston head 31 and cylinder head 24.

Figure 6:
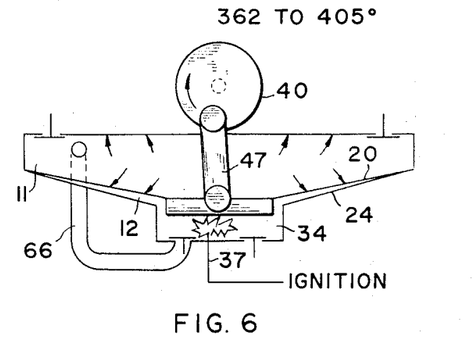
Figure 7:
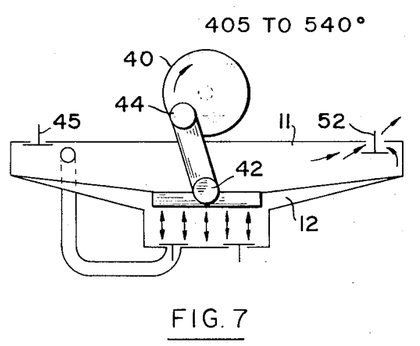

All of the four valves are closed at about the 360° position of the shaft 39, and ignition of the compressed combustible charge occurs just after the dead center or 360° position of the shaft 39 which ignition, in the illustration of FIG. 6, occurs at a position approximating 362°. As ignition continues, thereby energizing the power stroke of the plunger 26, the outlet valve 52 for the pressure compartment 18 is opened to permit the charge of air then present in such chamber to be expelled or accelerated therefrom through the port 46 and into the conduit 49 for use at the burner section therealong. This condition of the mechanism 10 is illustrated in FIG. 7 and it obtains from approximately 405° to 540° at which time the diaphragm 20 has been displaced into the extreme position thereof defining minimum volume for the pressure compartment 18 and maximum volume for the combustion compartment 19. It should be observed that prior to opening of the outlet valve 52, all four of the valves are closed for approximately 45°, whereupon the charge of air drawn into the pressure compartment 18 is compressed and is therefore accelerated under pressure into the outlet conduit 49 when the valve 52 is opened at about the 405° position of the shaft 39. Also, the combustion pressures in the compartment 19 tend to peak at this time and level off only after the exhaust valve 65 is opened.

Figure 8:
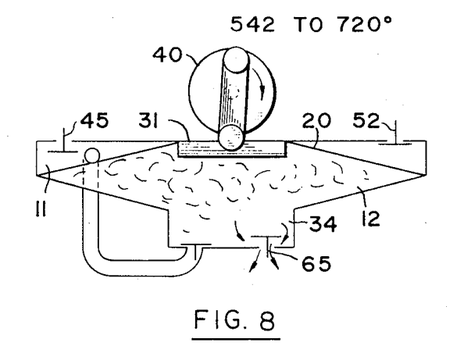

As illustrated in FIG. 8, as the shaft 39 continues to be displaced from about 540° to the 720° position thereof to terminate two complete rotations, the inlet valve 50 into the pressure compartment 18 is open as is the exhaust valve 65 for the combustion compartment 19. Accordingly, displacement of the diaphragm 20 into the starting position shown in FIG. 3 in which the diaphragm is in the extreme position thereof corresponding to minimum volume for the combustion compartment 19 and maximum volume for the pressure compartment 18, a fresh charge of air is drawn into the pressure compartment 18 through the inlet 45 and at the same time, the products of combustion are expelled from the compartment 19 through the exhaust port 62 and into the conduit 67 for delivery to the outlet conduit 49 and transport therethrough to the burner 86 therealong. Thus, a complete cycle of operation has occurred, and such cycles continue to be repeated for as long as the mechanism 10 is in operation and at a rate determined by the operator thereof.

Figure 4:
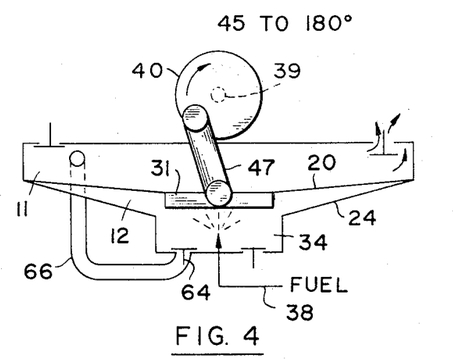

Comparing FIGS. 5 and 8, it will be evident that a charge of atmospheric air is drawn into the pressure compartment 18 once during each 360° rotation of the power shaft 39 and, comparing FIGS. 4 and 7, it will be equally evident that a charge of fresh air is accelerated from the pressure compartment 18 into the outlet conduit 49 for utilization by the burner section 89 once during each 360° rotation of the shaft 39 (i.e., twice for each complete cycle of operation in each instance). On the other hand, ignition occurs within the combustion compartment 19 only once during a complete cycle of operation of the mechanism so that the products of combustion from the compartment 19 are expelled into the outlet conduit 19 for utilization by the burner section 86 but once during a complete cycle of operation of the mechanism (i.e., once for each 720° displacement of the shaft 39).

As the result of this relationship, a lean fuel-air mixture (i.e., excess air) is always present in the combustion zone or burner 86 which is very advantageous in reducing undesirable, air-polluting emissions from the mechanism 10. In this respect, the internal combustion section 12 of the mechanism 10 is a low compression engine that runs rich or with a high fuel to air mixture so as to partially burn each charge of fuel admitted thereinto. This partially burned fuel and other products of combustion together with a large volume of air, much in access of that required for complete combustion, are transported to the burner 86 where combustion again occurs in association with additional fuel added through the fuel nozzle system 89. As a consequence of the lean mixture at the combustion chamber 86, the gases discharging through the turbine wheel 95 are low in undesirable combustion-related emissions, thereby making the mechanism very non-polluting.

In comparative tests that have been made, an automotive plant constructed in accordance with the present invention and essentially comprising the mechanism 10 illustrated in FIGS. 1 and 2 has been shown to have considerably less combustion-related emission of all types than conventional automobile engines of comparable horse power and performance used to power standard automobiles. For purposes of providing an indication of the relative performance of such a standard automobile engine and a power plant embodying the present invention, the following table is presented:

| Exhaust Component | Internal Combustion Engine | | Inventive Power Plant |
|---|---|---|---|
| | Prime Condition | Average Condition | Normal Condition |
| CO (carbon monoxide) | 1 ½% | 4-4% | 0.15% |
| NO$_x$ (oxides of nitrogen) | 800 ppm | 3000 ppm | 50 ppm |
| hydrocarbons (total) | 1365 ppm | 4000 ppm | 150 ppm |
| paraffins C$_1$-C$_5$ | 130 ppm | | |
| C$_n$ + Olefins | 155 ppm | | |

| | | | |
|---|---|---|---|
| $C_2$-$C_4$ | 500 ppm | | |
| $C_5$+ | | | 30 ppm |
| aromatics | 265 ppm | | |
| acetylines | 285 ppm | | |
| particulates (principally oxides of lead) | 0.75 mg/gm | 1.0 mg/gm | 0.05 mg/gm | ppm being parts per million by volume in the exhaust,
mg/gm being milligrams per gram of exhaust, and
CO percentage being the per cent by volume in the exhaust.

The engine conditions indicated in the table are as follows: prime condition for a standard internal combustion engine is that in which the engine is in excellent mechanical condition having had a recent tune-up, carburetor fuel-air ratio adjustment, and all presently available smog-abatement accessories functioning at peak performance; average condition for such engine is that in which the mechanical condition is good but the factors influencing performance are less than at peak condition and are those which one would expect to find in an automobile operated by the average owner; and the inventive power plant in the normal condition thereof corresponds to the average condition of the typical internal combustion engine operated by the average owner with no different maintenance than would be given thereto. The engines were operated over average speed ranges from idle to about 60 miles per hour, and the standard and accepted testing techniques used extensively for this purpose were employed in determining the amount of each component in the exhaust emission from the standard engine and from the power plant 10.

The considerable reduced carbon monoxide emissions from the inventive power plant are due primarily to the presence of a lean fuel to air mixture at the turbine burner 86 which cannot be maintained in an internal combustion engine because of the complex metering systems required for the air and fuel and the inherent tendencies of these two components to change their relative flow rates due to differences in the coeffecients of thermal expansion thereof and to engine vibration and changes therein as the engine operates over a wide velocity range. Generally, it may be said that the carbon monoxide emissions from a standard internal combustion engine are considerably greater at idle and low speeds than at normal cruising speeds whereas in the turbine engine no appreciable difference in carbon monoxide emissions is experienced over the entire operating range thereof owing to a simpler, stable and positive fuel and air-flow control system.

As concerns oxides of nitrogen, the emission level is governed by a number of factors including the fuel to air ratio, compression ratio, ignition timing, and temperature of the air drawn into the engine for combustion purposes. All of these factors are less stable and susceptible of refinement in the average internal combustion engine than in the inventive prime mover constituting the subject matter hereof.

The unburned hydrocarbon emissions are influenced by about the same factors as those influencing the carbon monoxide emissions, and hydrocarbon emissions also increase at idle and low speeds. For average urban driving at about 25 miles per hour, the unburned hydrocarbon emissions from the standard internal combustion engine are about 3.3 percent (by weight) of the fuel supplied to an engine in prime condition and equipped with the latest emission control devices.

Particulate emissions resulting from oxides of lead (about 70–80 percent of the total particulate emissions) are a consequence of the requirement for use of lead additives in the fuel for modern high compression internal combustion engines. Leaded fuels are not necessary in turbine-type engine systems because high compression and requirement for valve lubrication are not relevant thereto. Accordingly, nonleaded fuels can be used, thereby reducing the particulate emission owing to lead oxides by some 70 to 80 percent of the total particulate emissions.

The gases flowing from the outlet conduit 49 into the exhaust conduit 100 must pass through the turbine wheel 95 thereby energizing the same to impart torque to the turbine shaft 92 and to the power shaft 39 via the gears 96 and 97. Accordingly, power is imparted to the shaft 39 both by the reciprocable displacements of the plunger 26 and by rotation of the turbine 95. This has the result of the power plant 10 starting very quickly (for example, within 5 seconds) in the manner of the usual automobile internal combustion engine, whereas the usual turbine engine must obtain a velocity of the order of 10,000 RPM or more to provide sufficient compressed air to the combustion chamber for ignition. As soon as combustion is initiated in the compartment 19, power is imparted to the shaft 39 and large volumes of compressed air are supplied to the burner 86 to initiate combustion thereat, thereby energizing the turbine wheel 95. Evidently then, the prime mover has the quick-starting attributes of the usual internal combustion engine and also the advantageous features of the usual turbine engine, but it has neither of the smog-emissions limitations of the internal combustion engine nor the slow starting of the turbine engine.

The prime mover or mechanism 10 has very low friction in contrast to the usual reciprocating internal combustion engine which has a plurality of rings in each cylinder slidably engaging the walls thereof to effect the requisite sealing engagement of the piston with the circumjacent cylinder walls because no such high-friction sealing devices are required. Further, the reciprocable stroke of the plunger 26 is quite short with the result that there is low internal friction or mechanical hysteresis in the diaphragm 20 as it is displaced between the extreme alternate positions respectively illustrated in FIGS. 3 and 5. Nevertheless, because of the double frusto-conical configuration through which the diaphragm 20 moves, it has a large displacement even through the stroke thereof is quite short, whereby the operating velocity of the engine can be high and the fatigue factor of the diaphragm very low.

By way of further indicating the characteristics of the mechanism or prime mover 10, in a specific embodiment thereof substantially all of the parts are made of aluminum. The power shaft 39, which is made of steel, has a maximum velocity of approximately 3,000 RPM, and the stroke of the plunger 26 is approximately 2 inches. The diaphragm 20 is generally rectangular, having an axial length of approximately 16 inches and a transverse width of approximately 14 inches. The diameter of the piston head 31 is about 6 inches, and it is located at the center of the diaphragm 20. The peak pressure developed in the pressure compartment 18 in such prime mover is in the range of from 45 to 50 psig, and the peak pressure in the combustion compartment 19 is in the range of about 38 to 40 psig. Such prime mover uses regular automotive gasoline as the fuel, and a temperature of about 240° F is developed in the chamber 19.

It is not necessary that the mechanism have the configuration illustrated in the drawings especially as concerns the combustion compartment 19, piston head 31 and the cavity 34 into which the piston head is displaced both during purging of the compartment after combustion and during compression of the combustible materials prior to ignition. That is to say, the compressed combustible materials could be ignited at a location remote from the diaphragm 20 as, for example, by elongating the piston head 31 along the wall 35 thereof and the cavity 34 along its circumjacent wall 36 so as to form a more pronounced and usual piston-cylinder combination or, as another example, by compressing the combustible admixture into a long chamber or passageway which might be straight and in line with the axis of reciprocation of the plunger 26 or could be turned or otherwise configurated so as to be transversely oriented with respect to the axis of reciprocation of the plunger. In any case, such extensions or additions would essentially form continuations of the compartment 19 and constitute a part thereof. One advantage of such augmented separation of the diaphragm 20 from the hot burning gases would be that very inexpensive materials could be used to fabricate the diaphragm, although ordinary materials such as silicone rubber having working temperatures of 500° F or above are now used successfully in the specific configuration illustrated in FIG. 1.

The variable-volume compartments 18 and 19 defined in part by the reciprocable diaphragm 20 represent large volumetric displacements because of the double cone-shaped inversion of the diaphragm in being moved between the opposite extreme positions thereof, and such large volume displacements are effected with a very short stroke (thereby lending the mechanism to high speed reciprocation) and with very low mechanical friction, as explained heretofore. Such reduction in friction permits a much more efficient utilization of the fuel energy used by the mechanism, thereby permitting use of a smaller power system in any situation without a corresponding reduction in the output energy delivered thereby.

Respecting volumetric displacement and using the dimensions set forth in the foregoing example, a diaphragm 20 having a length and width of 16 inches and 18 inches, respectively, and a totol displacement of 2 inches — i.e., 1 inch in each direction from the center — will have a displacement of about 150 cubic inches (V = (16 × 14 × 1/3) × 2). A standard cylindrical piston-and-cylinder combination with the same stroke length would have a diameter of about 10 inches (D = 2 $\sqrt{R^2}$ = 150/pi 2) which is a totally impracticable size in the usual case.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. An internal combustion engine mechanism of the character described, comprising casing structure having a chamber therein provided with a valve-equipped inlet and with a valve-equipped outlet, a diaphragm mounted within said chamber and being displaceable between position extremes respectively corresponding to states of maximum and minimum volume, a reciprocable plunger connected with said diaphragm for substantially concurrent movement therewith between said position extremes, a power shaft journaled for rotation relative to said casing structure, crank means interconnecting said plunger and power shaft for interrelating the disparate motions described by said plunger and power shaft, means effecting operation of said valves in timed relation with the reciprocable displacements of said plunger so that said inlet and outlet will each be opened and closed during certain predetermined intervals in a complete cycle of operation of said mechanism, means for admitting fuel into said chamber, and an igniter for firing a combustible admixture of fuel and gas at a predetermined time in a cycle of operation of said mechanism.

2. The mechanism of claim 1 and further comprising a piston head fixedly connected with said plunger in general alignment with said igniter so that the hot combustion gases react at least initially primarily against said piston head in energizing the power stroke of said plunger.

3. The mechanism of claim 2 in which said casing structure defines a cylinder within said chamber adapted to receive at least a portion of said piston head therein whenever said diaphragm is in one said position extremes, and in which the facing end closure of said cylinder and piston head cooperate to define a combustion space operative to separate said diaphragm from the hot combustion gases at least upon initial combustion.

4. The mechanism of claim 3 in which said cylinder and piston head are relatively short so that said piston head enters the cylinder only during the relatively brief interval that said diaphragm is approaching and retreating from the extreme position thereof adjacent said cylinder.

5. The mechanism of claim 1 and further comprising an outlet conduit connected with said outlet, a turbine wheel connected with said power shaft so as to rotate therewith and being located along said outlet conduit so as to be driven by the gaseous flow therethrough, and a turbine combustion chamber disposed along said outlet conduit intermediate said outlet and turbine wheel.

6. The mechanism of claim 5 and further comprising a piston head fixedly connected with said plunger in general alignment with said igniter so that the hot combustion gases react at least initially primarily against said piston head in energizing the power stroke of said plunger, and in which said casing structure defines a cylinder within said chamber adapted to receive at least a portion of said piston head therein whenever said diaphragm is in one of said position extremes, and in which the facing end closure of said cylinder and piston head cooperate to define a combustion space operative to separate said diaphragm from the hot combustion gases at least upon initial combustion.

7. A mechanism of the character described constituting in part a gas compressor and in part an internal combustion engine, comprising casing structure having a chamber therein provided with a valve-equipped inlet and with a valve-equipped outlet, a diaphragm mounted within said chamber and being displaceable between position extremes respectively corresponding to states of maximum and minimum volume, a reciprocable plunger connected with said diaphragm for substantially concurrent movement therewith between said position extremes, a power shaft journaled for rotation relative to said casing structure, crank means interconnecting said plunger and power shaft for interrelating the disparate motions described by said plunger and power shaft, means effecting operation of said valves in timed relation with the reciprocable displacements of said plunger so that said inlet and outlet will each be opened and closed during certain predetermined intervals in a complete cycle of operation of said mechanism, said diaphragm being mounted within said chamber in a generally central position with respect thereto so as to subdivide the same into a compressor compartment and an engine compartment each of which is provided with a valve-equipped inlet and with a valve-equipped outlet including the aforementioned inlet and outlet; said mechanism as respects the gas compressor part thereof being operative to expel at an elevated pressure through the outlet associated with said compressor compartment gas admitted through the inlet associated therewith, means for admitting fuel into said engine compartment, and an igniter for firing a combustible admixture of fuel and gas at a predetermined time in a cycle of operation of said mechanism; said means effecting operation of said valves being operatively associated with all of said inlet and outlet valves.

8. The mechanism of claim 7 and further comprising an outlet conduit respectively connected with each of said outlets, conduit means interconnecting the inlet of said engine compartment with said compressor compartment so as to receive air under pressure therefrom, a turbine wheel connected with said power shaft so as to rotate therewith and being located along said outlet conduit so as to be driven by the gaseous flow therethrough, and a turbine combustion chamber disposed along said outlet conduit intermediate said outlets and turbine wheel, the inlet to said compressor compartment being connected with atmosphere so that said gas compressor supplies air for combustion both to said engine compartment and to said turbine combustion chamber.

9. The mechanism of claim 8 and further comprising a piston head fixedly connected with said plunger in general alignment with said igniter so that the hot combustion gases react at least initially primarily against said piston head in energizing the power stroke of said plunger.

10. The mechanism of claim 9 in which said casing structure defines a cylinder within said chamber adapted to receive at least a portion of said piston head therein whenever said diaphragm is in one of said position extremes, and in which the facing end closure of said cylinder and piston head cooperate to define a combustion space operative to separate said diaphragm from the hot combustion gases at least upon initial combustion.

11. The mechanism of claim 8 in which the aforesaid valve associated with the inlet into said compressor compartment is a pressure-responsive valve opened and closed in accordance with the contemporary value of the pressure within said chamber, and in which said means effecting operation of said valves includes timing apparatus interconnecting said power shaft and the valves associated with the outlet of said compressor compartment and with the inlet and outlet of said engine compartment to open and close the same in mechanically enforced synchronism with the angular displacements of said power shaft.

12. The mechanism of claim 8 and further comprising an exhaust diffuser connected with said outlet conduit down stream of said turbine wheel, said exhaust diffuser having a long narrow discharge outlet for the escape of exhaust to atmosphere.

13. The mechanism of claim 12 in which said exhaust diffuser defines an enlarged expansion chamber communicating with said exhaust conduit and into which the exhaust gases flowing therethrough expand in moving toward said discharge outlet.

14. The mechanism of claim 8 in which said diaphragm is a flexible resilient component tending to maintain physical dimensions after use.

* * * * *